United States Patent
BenHanokh et al.

(10) Patent No.: US 12,355,839 B2
(45) Date of Patent: *Jul. 8, 2025

(54) WORKLOAD-BASED CACHE COMPRESSION IN A DISTRIBUTED STORAGE SYSTEM

(71) Applicant: Red Hat, Inc., Raleigh, NC (US)

(72) Inventors: Gabriel Zvi BenHanokh, Tel Aviv (IL); Orit Wasserman, Mitzpe-Aviv (IL); Yehoshua Salomon, Kfar-Saba (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,157

(22) Filed: Feb. 23, 2024

(65) Prior Publication Data
US 2025/0016227 A1   Jan. 9, 2025

Related U.S. Application Data

(63) Continuation of application No. 17/829,334, filed on May 31, 2022, now Pat. No. 11,943,296.

(51) Int. Cl.
*H04L 67/1097* (2022.01)
*G06F 12/0802* (2016.01)

(52) U.S. Cl.
CPC ...... *H04L 67/1097* (2013.01); *G06F 12/0802* (2013.01); *G06F 2212/60* (2013.01)

(58) Field of Classification Search
CPC .......... H04L 67/1097; G06F 12/0802
See application file for complete search history.

(56) References Cited

U.S. PATENT DOCUMENTS

| 8,762,583 | B1 | 6/2014 | Faibish et al. |
| 9,880,928 | B1 | 1/2018 | Bono et al. |
| 10,895,987 | B2 | 1/2021 | Kang et al. |
| 2004/0010621 | A1 | 1/2004 | Afergan et al. |
| 2013/0205071 | A1 | 8/2013 | Vasudevan |

(Continued)

OTHER PUBLICATIONS

Tuduce, et al., "Adaptive Main Memory Compression," USENIX Association, 2005 USENIX Annual Technical Conference, usenix.org/legacy/evenl/usenix05/tech/general/full_papers/tuduce/tuduce.pdf, 2005, 14 pages.

(Continued)

*Primary Examiner* — Viet D Vu
(74) *Attorney, Agent, or Firm* — Dority & Manning, P.A.

(57) ABSTRACT

An example method may include receiving, in a virtualized execution environment, a data access request from a storage system, identifying, in view of a virtualized execution image associated with the virtualized execution environment, an application running in the virtualized execution environment, generating a cache classification that specifies whether data accessed by the application is suitable for cache compression, including, in the data access request, a tag indicating whether cached data is to be accessed in a compressed-memory cache, wherein the tag is determined in view of the cache classification, and sending, to a server of the storage system, the data access request. The application can be identified in view of metadata included in the virtualized execution image, where the metadata comprises one or more of an application name or an application version.

20 Claims, 7 Drawing Sheets

(56) References Cited

U.S. PATENT DOCUMENTS

2016/0371190 A1* 12/2016 Romanovskiy ....... G06F 3/0659
2019/0243780 A1    8/2019 Gopal et al.
2021/0136080 A1    5/2021 McMullen
2021/0157485 A1    5/2021 Tomei et al.

OTHER PUBLICATIONS

Non-Final Office Action for U.S. Appl. No. 17/829,334, mailed Aug. 9, 2023, 7 pages.

* cited by examiner

WORKLOAD-BASED CACHE COMPRESSION IN A DISTRIBUTED STORAGE SYSTEM

RELATED APPLICATION

This application is a continuation of U.S. patent application Ser. No. 17/829,334, filed on May 31, 2022, entitled "WORKLOAD-BASED COMPRESSION IN A DISTRIBUTED STORAGE SYSTEM," now U.S. Pat. No. 11,943, 296 B2, the disclosure of which is hereby incorporated herein by reference in its entirety.

TECHNICAL FIELD

The present disclosure is generally related to data compression in computer systems, and more particularly, to workload-based compression in a distributed storage system.

BACKGROUND

Modern computers often store data in a distributed storage system to enhance the access, redundancy, and capacity of data storage devices. The distributed storage system may include multiple storage nodes that function to store, organize, and provide access to data. The data may include user data generated by an application. The distributed storage system may include a server portion that manages the data and a client portion that provides access to the data. The client portion may include code (e.g., a client module) that enables a client device to access data of the distributed data store.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
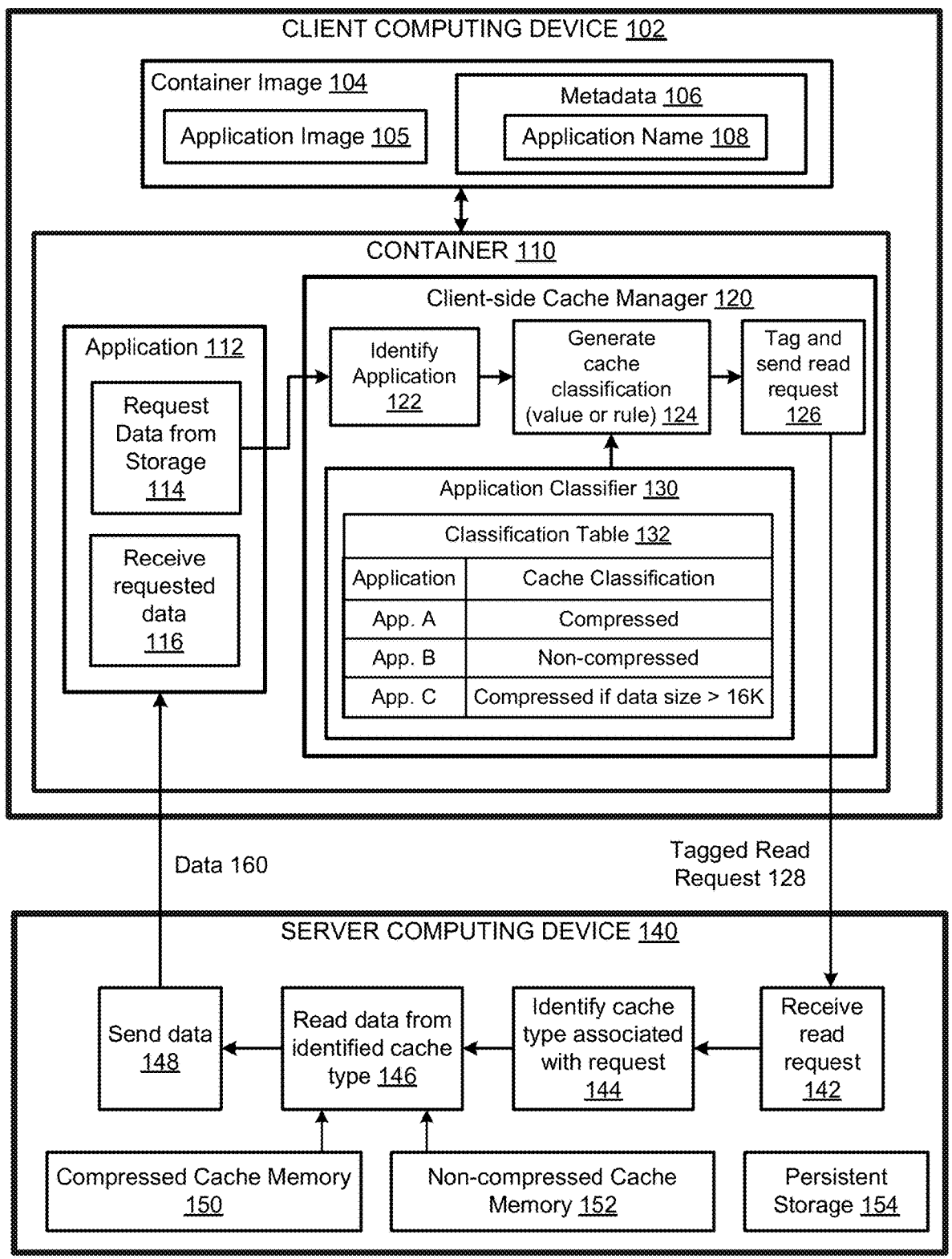
FIG. 1 depicts a high-level block diagram of an example computing system in which a cache manager located at a client computing device can determine whether to access data for a particular application in a compressed cache or a non-compressed cache, in accordance with one or more aspects of the present disclosure.

Described herein are systems and methods for workload-based cache compression in a distributed storage system. The storage system can store data in persistent storage devices such as magnetic or solid state disks. Client computer systems can communicate with the storage system, e.g., via a computer network, to store and retrieve data in the storage system. The persistent storage devices used by the storage system can be relatively slow to access in comparison to memory storage such as Random Access Memory (RAM). An in-memory cache can be used to speed up access to data stored on slower persistent storage devices by temporarily storing portions of the data in memory storage that can be accessed more quickly than the persistent storage. Thus, for example, data that is in the cache can be read more quickly than data that is not in the cache. However, the storage capacity of the in-memory cache is ordinarily small compared to the capacity of the persistent storage devices. Further, determining whether to store particular data items in the cache is difficult because future access requests are often unpredictable. Storing more data in the cache can increase the likelihood that requested data is in the cache, so it is desirable to increase the size or capacity of the cache.

Cache compression can be used to increase the amount of data that can be stored in a cache by compressing the contents of the cache. For example, data can be compressed upon being stored in the cache and decompressed upon being retrieved. The compression and decompression operations are computationally-intensive and can increase access times, however. Thus, there is a trade-off between reduction in the size of cached data and increased overhead such as increased access time and processor usage caused by compression. It is desirable to compress cached data for which the benefit of reduction in the size of cached data outweighs the cost of increased access latency over a period of time. However, this tradeoff can be difficult to evaluate at the time cached data is accessed.

Cache compression can be beneficial for workloads that access memory sequentially or with high locality of reference (e.g., data items in a relatively small region are accessed over a period of time). In the case of sequential memory reads, a region of cache memory can be decompressed, and the decompressed memory can be accessed by a sequence of memory read operations, so the decompression overhead can be amortized across the read operations. For example, an application that accesses relatively large chunks of data and uses a substantial amount of the decompressed data can be suitable for use with a compressed cache. Cache compression can be inefficient, however, for workloads that perform numerous small reads in different regions of memory, in a random-access manner. For random-access workloads, compressing or decompressing a cached data item is unlikely to be beneficial because the data item is unlikely to be accessed while the data item is still in the cache. For example, an application that performs random access operations on relatively small chunks of data can be unsuitable for use with a compressed cache. However, in existing storage systems, applications do not ordinarily inform the storage system of their expected access patterns, and determining whether to use cache compression in existing storage systems can be difficult.

Aspects of the present disclosure address the above and other deficiencies by providing a cache manager that can, upon identifying an application that has issued a data access request, determine a cache classification that indicates whether the application's data access patterns are suitable for cache compression. The cache manager can then direct the data access request to compressed cache memory if the cache classification indicates that the application's data access patterns are suitable for cache compression. "Compressed cache memory" herein shall refer to memory, such as Random Access Memory (RAM), in which data is stored in a compressed form. The cache manager can identify the application based on a virtualized execution image, such as a container image, associated with the application.

The cache manager can use a classifier to generate the cache classification based on past access patterns or other information associated with the application. An access pattern that is suitable for cache compression can be, for example, a sequence of memory reads of memory locations having sequential addresses. An access pattern that is not suitable for cache compression can be, for example, a sequence of memory reads of memory locations having addresses that appear random, e.g., are not located within a region of memory of a threshold size. If the cache classification indicates that the application's data access patterns are not suitable for cache compression, then the cache manager can direct the memory access request to non-compressed cache memory.

The cache classification can be, for example, a Boolean value that indicates whether cache compression is to be used. Alternatively, the cache classification can be a classification rule that includes one or more cache classification criteria, such as a threshold data size, that the cache manager can evaluate for each memory access request. If the cache classification criteria are satisfied, then the cache manager can direct the memory access request to compressed cache memory. Otherwise, the cache manager can direct the memory access request to non-compressed cache memory. Further, the cache classification can include or be associated with a probability that the application's data access patterns are suitable for cache compression. The probability can be, e.g., a percentage, and can be generated by the classifier.

The classifier can use a classification table to map applications or other application-related entities to cache classifications. The classification table can be generated from information such as access patterns or configuration information specifying whether a particular application is to use cache compression. Machine learning techniques can be used to learn to generate the classification for a particular application from access patterns of the application, e.g., whether read operations performed by the application are usually of sequential memory addresses.

The application can execute in a virtualized execution environment. The virtualized execution environment can include one or more virtual machines on which the application can execute. Alternatively or additionally, the virtualized execution environment can include one or more containers. The application can execute in one or more containers, and the containers can be controlled by a container manager. Each container can handle infrastructure-related tasks such as deployment of the application for operation. The container can include the application and the application's dependencies, which can include libraries and configuration information. A containerized cluster can be a cluster of physical or virtual computing devices that run containerized applications. The containerized cluster can include entities that represent resources in the cluster, such as virtual machines, nodes representing physical or virtual computing devices, persistent volumes representing physical or virtual storage devices, and networks.

A virtualized execution environment can be created from a virtualized execution image. A virtualized execution image can be, e.g., a virtual machine image and/or a container image. For example, a virtual machine can be created from a virtual machine image, which can be a file that contains a virtual disk. The virtual disk can have an installed bootable operating system. As another example, a container can be created from a container image. The application can be identified from metadata included in the virtualized execution image and/or the virtualized execution environment in which the application is running. A virtualized execution manager, such as a cluster manager or container manager, can deploy the virtualized execution image onto a client computer system for subsequent execution. Upon being deployed, the virtualized execution image can be loaded into memory of a client computing device and executed.

The cache classification can be generated for a particular application at the application's deployment time by a component of the cache manager (e.g., at a client computing device), so that the classification operation would not have be performed for each read request. If the cache classification is a rule having one or more associated cache classification criteria, then the criteria can be evaluated at the client computing device for each read request, e.g., using attributes of the request, such as data size, as input to the criteria evaluation. The client can then add a cache compression indicator determined from the cache classification, such as a tag, to the read request. The tag can indicate whether to use compressed cache memory for the read request. The client computing device can send the read request to a storage server, and the storage server can use the tag to determine which type of cache memory, e.g., compressed or non-compressed, to access in response to the read request.

The storage server can receive the read request and attempt to retrieve the requested data from the specified type of cache memory, e.g., at a memory address specified in the read request, and send the requested data to the client if the data is present in the specified type of cache memory. If the data is not present in the specified type of cache memory, the storage server can retrieve the requested data from longer-term storage, e.g., disk storage, and send the data to the client. The storage server can additionally determine whether the data is present in each type of cache memory, e.g., compressed and non-compressed, since the application can store data in either type of cache memory. In one example, the application may have multiple different threads of execution, each having a different access pattern. One application thread can perform reads using 8 kilobyte blocks, while another application thread, such as a background thread, can read data in 1 megabyte blocks. Depending on which thread reads a particular block of data, the data can be in either the compressed cache or the non-compressed cache. For such applications, the storage server can attempt to retrieve the requested data from both the compressed cache and the non-compressed cache. In one example, the storage server can attempt to retrieve the requested data from the specified type of cache memory (e.g., compressed), and, if the requested data is not present in the specified type of data, from the other type of cache memory (e.g., non-compressed). In another example, the storage server can attempt to retrieve the requested data from both types of cache memory (e.g., compressed and non-compressed) in parallel. If the data is not present in either type of cache memory, the storage server can retrieve the requested data from longer-term storage. The storage server can then send the requested data to the client.

Alternatively, classification of read requests received from the application can be performed by the storage server, in which case the client would not have to perform the classification and tagging of read requests described above. The storage server can use a storage entity specified in the request, such as a data entity identifier, as input to the classifier. The data entity identifier can identify the storage which is accessed by an application, and thus can be used to identify an application. The storage server can generate a cache classification using, for example, a server-side classification mapping table that maps data entities to cache classifications. The server-side classification mapping table can be generated similarly to how the client-side classification mapping table described above is generated. If the classification includes cache classification criteria, the cache manager can evaluated the criteria at the storage server using attributes of the read request as input. The storage server can use the classification to determine whether to access compressed or non-compressed memory for the read request. The storage server can attempt to read the data from the type of cache memory specified by the classification, and send the data to the client if the data is present in the specified type of cache memory. In some embodiments, if the data is not found in the type of cache memory specified by the classification, the storage server can attempt to read the data from another type of cache memory, e.g., the other type of cache memory. The storage server can read data from the other cache type if, for example, the application has multiple threads, each having a different access pattern. Depending on which thread reads a particular block of data, the data can be in either the compressed cache or the non-compressed cache. In another example, the storage search can read data from each type of cache memory in parallel. If the data is not present in the type (or types) of cache memory from which reads are attempted, the storage server can retrieve the requested data from long-term storage and send the data to the client.

The systems and methods described herein include technical improvements to data storage technology. In particular, aspects of the present disclosure may increase the efficiency of memory access operations by accessing compressed cache memory if a request is from an application having an access pattern for which cache compression is suitable. Thus, the cache compression is used if the workload has a pattern that is likely to benefit from cache compression, such as sequential memory accesses. Otherwise, if the workload is not likely to benefit from cache compression, then non-compressed cache memory can be used, and the overhead of cache compression is not incurred unnecessarily.

Since the cache manager can select the appropriate type of memory cache, e.g., compressed or non-compressed, using a classification of the application, there is no need to modify the application to provide an access pattern classification to the cache manager. The access pattern classification can be determined by the cache manager at the client (or server) so that the appropriate type of cache memory (compressed or non-compressed) can be selected for each application. Since the classifier can learn which type of cache memory is suitable for each application from past accesses, the cache manager can generate an accurate classification for each application. Using the classification appropriate for each application increases overall storage system performance, since cache compression is used for applications that benefit from it, such as applications that access data sequentially. Further, cache compression is not used for applications that are not expected to benefit from it.

Thus, the disclosed technique of cache compression management can reduce the amount of storage space used to cache data when the cost of the increased latency incurred by compression operations is likely to be outweighed by the benefit of reduced data access latency that occurs when requested data is available in the cache.

Various aspects of the above referenced methods and systems are described in details herein below by way of examples, rather than by way of limitation. The examples provided below discuss management of cache compression in a container environment. Applications are described as executing in and being identified by their association with container images or data entities of the container environment. In other examples, applications can execute in other environments and be identified by other information, such as application names, process names, executable file names, or the like. Further, data is described as being stored at a storage server that receives data access requests from client computing devices. In other examples, data can be stored in any suitable storage system. Although the cache is described as being a memory and long-term storage is descried as being a disk, the cache and long-term storage can be any data storage components of a memory hierarchy in which the cache has lower access latency and smaller capacity than the long-term storage.

FIG. 1 depicts a high-level block diagram of an example computing system in which a cache manager 120 located at a client computing device 102 can determine whether to access data for a particular application 112 in a compressed cache or a non-compressed cache, in accordance with one or more aspects of the present disclosure. A container image 104 can be stored on a disk or other storage device of the client computing device 102. The container image 104 can include program code instructions that can run in a container manager on the client computing device 102. The container image 104 can also include image metadata 106, such as an application name 108. The application name 108 can be, e.g., a text string identifying an executable program binary or other suitable identifier for an application. The container image 104 can be, for example, a set of layers, one or more of which can form an application image 105. The application image can include program code and data of the application.

The container manager can load the container image 104 into memory and execute the program code instructions of the application image 105 in a container 110 as a running application 112. The application 112 can access data stored at a server computing device 140 by sending read requests 128 to the server computing device 140 via a computer network or other suitable form of communication. The application 112 can interact with a programming interface of a storage system or data store to create a read request, for example.

The server computing device 140 stores data in persistent storage 154, which can be, e.g., a rotational magnetic disk or a solid-state disk. The server computing device 140 can be a component of a storage system that processes read requests from the programming interface used by the application 112, for example. The server computing device 140 also includes compressed cache memory 150 and non-compressed cache memory 152, each of which can store one or more data items (e.g., blocks, objects, byte sequences, or the like) that are also stored in the persistent storage 154. Each cache memory 150, 152 can be, for example, Random Access Memory (RAM), which can be implemented using Dynamic RAM (DRAM) or the like. Each cache memory 150, 152 is ordinarily smaller than and has lower access latency than persistent storage 154.

Compressed cache memory 150 stores data in a compressed form, which is ordinarily smaller (e.g., uses less memory space) than the non-compressed form of the same data. The compressed form can be generated by computer program instructions executed on server computing device 140 or by a memory sub-system, for example. Compression and de-compression can be performed using a Lempel-Zip compressor or other suitable compression algorithm. The compression algorithm can be implemented using computer program instructions, hardware devices, or a combination thereof. Compression of data can be performed prior to storing the data in the compressed cache memory 150. Similarly, decompression of data can be performed subsequent to retrieving the compressed form of the data from the compressed cache memory 150. The compression and de-compression operations can be performed by the memory sub-system in response to requests to store and retrieve data in the compressed cache memory 150, respectively. Since the compressed form is stored in the compressed cache memory 150, the same data item effectively uses less memory space in the compressed cache memory 150 than in the non-compressed cache memory 152. However, because of the compression and de-compression operations, data write and data read operations performed on the compressed cache memory 150 ordinarily have greater latency than the analogous data write and data read operations performed on the non-compressed cache memory 152. Because of these differences between the compressed cache memory 150 and non-compressed cache memory 152 in storage capacity and access times, the two different types of cache memory are suitable for different data access patterns. For example, storing a 64 kilobyte (Kbyte) sequence of bytes in the compressed cache memory 150 may use 32 kilobytes of the memory capacity of the compressed cache memory 150 if 50% compression is achieved. Compressing and decompressing the data each have an associated latency. The latency of compressing a small amount of data, such as 4 Kbytes, can be nearly as high as the latency of compressing a larger amount of data, such as 64 Kbytes because, for example, larger amounts of data can be more effectively batched together by the memory sub-system. Each compression or de-compression operation also has an overhead that causes additional latency.

The compressed cache memory 150 can be suitable for sequential accesses of larger sequences of data, e.g., a read of each byte in a sequence of 64 Kbytes. In contrast, the non-compressed cache memory 152 can be suitable for random cache accesses in which smaller chunks of data are read from memory locations at different locations for which accesses are difficult to amortize. For example, reading 64 Kbytes of data in 16 non-contiguous 4 Kbyte blocks can have substantially greater compression and/or de-compression latency than reading a single 64 Kbyte sequence of data. Thus, the non-compressed cache memory 152 can be suitable for reading the 16 non-contiguous 4K byte blocks in one example.

The server computing device 140 can process each read request 128 by reading the requested data from compressed cache memory 150, non-compressed cache memory 152, or, if the data is not in cache memory, from persistent storage 154. The server computing device 140 can determine whether to retrieve the data from compressed cache memory 150 or non-compressed cache memory 152 based on information included in the read request 128 by the client-side cache manager 120, such as a tag, as described herein. The server computing device 140 can also attempt to retrieve the data from each type of cache memory. For example, the server computing device 140 can attempt to retrieve the data from the type determined based on the information included in the read request 128. Alternatively, the server computing device 140 can attempt to retrieve the data from each type of cache memory in parallel. If the data is not present in either type of cache memory (compressed or non-compressed) then the server computing device 140 can read the requested data from persistent storage 154. The server computing device 140 can then send the data 160 that has been read from cache memory 150, 152 or persistent storage to the application 112 on the client computing device 102, and the application 112 can receive the data 160. A client-side cache manager 120 can generate a cache classification for an application 112. The cache classification can indicate whether the data access patterns of the application are expected to be suitable for cache compression. The cache classification can be based on, for example, past accesses (e.g., reads and/or writes) performed by the application 112, on characteristics of the application 112, which can be provided as configuration information, or a combination of both. The client-side cache manager 120 can add an indication (e.g., a tag) to the read request 128 indicating whether the request is to access the compressed cache memory 150 or, alternatively, the non-compressed cache memory 152 to request cached data. The client-side cache manager 120 can then send the read request 128 to the server computing device 140. The client-side cache manager 120 can be located in the container 110 or, alternatively, in another component running on client computing device 102 that can be invoked by the client-side cache manager 120.

To read a data item from persistent storage 154, the application 112 can invoke or perform an operation that requests data from storage (operation 114). The data request operation 114 can be provided by a programming interface of a storage system, operating system, or other component that generates read requests for a storage system that stores data in persistent storage 154 on server computing device 140.

The client-side cache manager 120 can receive the read request generated by the application 112. The client-side cache manager 120 does not necessarily receive the read request directly from the application 112, but can instead receive a read request generated by a programming interface of a storage system, an operating system, a container manager, a device driver, or other component that generates read requests to be sent to a storage system. The read request can specify a persistent storage address that identifies the data item to be read, and a number of bytes of data to be read, or any other suitable reference to a data item stored in the persistent storage 154.

The client-side cache manager 120 can identify the application 112 that generated the read request (operation 122). Since the identity of the application 112 is not necessarily provided directly to the client-side cache manager 120 by the application 112, the application 112 can access the application name 108 (or other application identity information) in the image metadata 106 of the container image 104. The application name 108 can be used as the application identity. The client-side cache manager 120 can generate a cache classification based on the application identity (operation 124). The cache classification can indicate whether data accessed by the application is suitable for cache compression. The cache classification can be represented as a value, e.g., "compressed" or "non-compressed", or a rule. The rule can specify one or more cache classification criteria that can be evaluated for each read request to determine a cache classification value for the particular request, as described below. An example rule is "compressed if data size >16K." The rule can be evaluated to determine a value of "compressed" if the rule criteria is satisfied (e.g., if the read request specifies a data size >16K) or "non-compressed" if the rule criteria is not satisfied.

To generate the cache classification, the client-side cache manager 120 can invoke an application classifier 130, which can search a classification table 132 for an entry that associates the application identity with a cache classification. The cache classification can be a value such as "compressed" or "non-compressed." Alternatively, the cache classification can be a classification rule that specifies one or more cache classification criteria and can be evaluated to determine a classification value. For example, evaluation of a classification rule can generate the cache classification can be "compressed" if the rule's criteria are satisfied, or "non-compressed" if the criteria are not satisfied. The criteria can be, for example, Boolean expressions having variables that can be evaluated in response to receiving a memory read request. The variables can include a data size variable that represents the data size specified by the read request.

An example classification table 132 is shown in the application classifier 130. The example classification table 132 includes three entries, each of which associates an application identity with a cache classification: a first entry associates an application identity "A" with classification value "compressed", a second entry associates an application identity "B" with classification value "non-compressed", and a third entry associates an application identity "C" with classification rule "compressed if data size >16 kbytes." Thus, according to the example table 132, an application named "A" is classified as "compressed", an application named "B" is classified as "non-compressed", and an application named "C" is classified as "compressed" if, upon evaluation of the classification rule, the read request specifies a data size of greater than 16 Kbytes. Although described as a table in the examples herein, the classification table 132 can be any suitable data structure that represents a set of associations in which each association associates an application with a cache classification.

The client-side cache manager 120 can generate the cache classification in the container 110, e.g., in response to each read request, as shown in operation 124. Alternatively or additionally, the cache classification can be generated as part of a container deployment process, in which case generating cache classification value of "compressed" or "non-compressed" (operation 124) can be performed once for the container 110 (at deployment time). If the generated cache classification does not include a rule, then the client-side cache manager 120 can, in response to each read request, access the generated classification value and tag the read request in accordance with the generated classification (operation 126, without generating the cache classification at operation 124). If the generated cache classification includes a rule, then the client-side cache manager 120 can, in response to each read request, evaluate the rule and determine a classification value of "compressed" or "non-compressed" in accordance with the result of evaluating the rule (without generating the cache classification at operation 124).

The classification table 132 used by the application classifier 130 can be generated from configuration information specifying particular classifications for particular applications. For example, a configuration parameter can specify that an application "A" is classified as "compressed." The classification can be specified as "compressed" because, for example, the application is a streaming video or audio application that reads data from persistent storage. The classification can be specified as "non-compressed" because, for example, the application is a transaction processing application that performs short transactions and accesses small data items in a random-access pattern. As an alternative to using the classification table 132, the application classifier 130 can use a machine learning model trained on historical access pattern data for particular applications. The access pattern data can include a determined classification for each particular application. The determined classification can be determined by analyzing the historical access patterns to determine whether the access patterns are sequential accesses or random accesses, for example. The historical access pattern data thus includes a set of records, each of which includes an application identity (e.g., an application name), a determined classification of the application, and associated features, such as a data size and/or data location, an application type (e.g., streaming, transaction processing, interactive user interface, and so on), an application version, or the like. The machine learning model can be generated from such historical access pattern data using a training process. The machine learning model can be trained to generate cache classifications from data available at the time a read request is received, such as an application identifier (or data entity identifier) and values of one or more features such as those listed above. The machine learning model can be any suitable machine learning model or heuristic model, such as a Linear Regression, Bayes, Random Forest, Support Vector Classifier, Decision Tree, Gradient Boosted Tree, K-Nearest Neighbors model, or the like. The model can be implemented by one or more neural networks.

Upon generating the cache classification, the client-side cache manager 120 can determine a tag value in accordance with the cache classification, add the tag value to the read request, and send the tagged read request 128 to the server computing device 140 (operation 126). The tag value can be "compressed" (or a corresponding value, e.g., 1 or true) if the classification is "compressed" or if the classification includes criteria that are satisfied. The tag value can be "non-compressed" (or a corresponding value, e.g., 0 or false) if the classification is "non-compressed" or if the classification includes criteria that are not satisfied.

The server computing device 140 can receive the read request 128 (operation 142), identify the cache type associated with the request (operation 144), read data from the identified cache type (operation 146), and send the data 160 to the application 112 on the client computing device 102 (operation 148). The cache type associated with the request can be identified from the tag value attached to the request. Thus, the cache type can be "compressed" or "non-compressed". If the cache type is "compressed", the server computing device 140 can direct the request to the compressed cache memory 150, e.g., by requesting the data from the compressed cache memory 150 using the attributes of the read request (e.g., address and data length). Alternatively, if the cache type is "non-compressed", the server computing device 140 can direct the request to the non-compressed cache memory 152, e.g., by requesting the data from the non-compressed cache memory 152 using the attributes of the read request. If the requested data is present in the cache memory to which the request is directed, then the server computing device 140 can retrieve the requested data from the corresponding cache memory (operation 146) and send it to the application 112 (operation 148). Reading data from the compressed cache memory 150 can cause a compressed form of data to be read from the compressed cache memory and provided as non-compressed data as a result of the read operation.

In some embodiments, if the data is not present in the cache memory to which the request is directed, the server computing device 140 can attempt to read the data from another type of cache memory, e.g., the type of cache to which the request is not directed. The storage server can read data from the other type of cache memory if, for example, the application has multiple threads, each having a different access pattern. Depending on which thread reads a particular block of data, the data can be in either the compressed cache or the non-compressed cache.

If the requested data is not present in the cache memory from which reads are attempted, then the server computing device 140 can retrieve the requested data from the persistent storage 154 and send it to the application 112. In one example, compression is not performed by the cache manager disclosed herein when storing data in persistent storage 154 or in non-compressed cache memory 152. The application 112 can receive the requested data 160 (operation 116) and perform other operations using the data 160. Similar techniques can also be applicable to split writes into compressed and non-compressed write caches. Write caches can be stored in persistent memory, for example. Storing data in the compressed cache memory 150 can cause the data to be automatically compressed (e.g., by the memory sub-system) to generate a compressed form of the data, and the compressed form of the data to be stored in the compressed cache memory 150. Storing data in the non-compressed cache memory 152 does not cause the data to be compressed, and the data is in the non-compressed cache memory 152 without being compressed.

Figure 2:
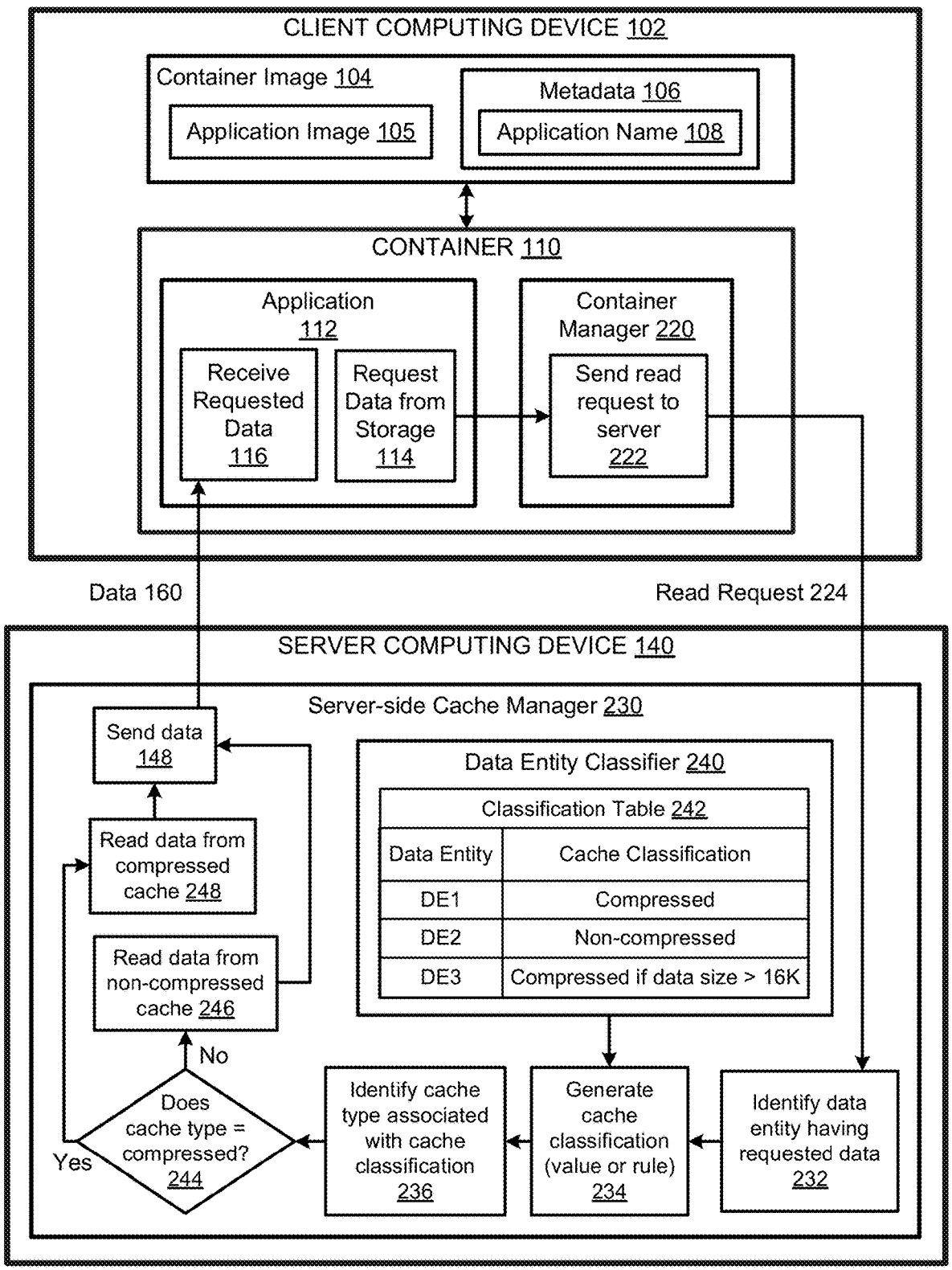
FIG. 2 depicts a high-level block diagram of an example computing system in which a cache manager located at a server computing device can determine whether to access data for a particular data entity in a compressed cache or a non-compressed cache, in accordance with one or more aspects of the present disclosure.

FIG. 2 depicts a high-level block diagram of an example computing system in which a server-side cache manager 230 located at a server computing device 140 can determine whether to access data for a particular data entity in a compressed cache or a non-compressed cache, in accordance with one or more aspects of the present disclosure. As described above with reference to FIG. 1, an application 112 can invoke or perform an operation that requests data from storage (operation 114). A container manager 220, or a component thereof, in the container 110 can send the read request to the server computing device 140 as a read request 224 (operation 222). The container manager 220 need not add a tag the read request. The server computing device 140 can identify the appropriate cache type for the application 112 using a server-side cache manager 230 as described below.

The server-side cache manager 230 can receive the read request 224 and identify a data entity (e.g., a volume, file, directory, object, bucket, disk image, or other form of data that can be persistent) on which the requested data is stored (operation 232). The data entity can correspond to the application 112. The identity of the application 112 is not necessarily available to the component of the server-side cache manager 230 that processes the read request 224. The server-side cache manager 230 can then generate a cache classification based on the identity of the data entity (operation 234). The cache classification can indicate whether data accessed by the application is suitable for cache compression. For example, the server computing device 140 can invoke a data entity classifier 240, which can search a classification table 242 for an entry that associates the data entity with a cache classification. The cache classification can be "compressed" or "non-compressed," or can include a rule that specifies one or more cache classification criteria that can be evaluated for each read request to determine a cache classification for the particular request.

The data entity classifier 240 can use a classification table 242 to generate a classification for a given data entity. The cache classification can be represented as a classification value, e.g., "compressed" or "non-compressed", or a classification rule that can be evaluated to determine a classification value, as described above with reference to the application classifier 130 of FIG. 1. An example classification table 242 shown in FIG. 2 includes three entries: a first entry associates a data entity identity "DE1" with classification "compressed", a second entry associates a data entity identity "DE2" with classification "non-compressed", and a third entry associates a data entity identity "DE3" with classification rule "compressed if data size >16 kbytes." Thus, according to the example classification table 242, a data entity having the identifier "DE1" is classified as "compressed", a data entity having the identifier "DE2" is classified as "non-compressed", and a data entity having the identifier "DE3" is classified as "compressed" if the read request specifies a data size of greater than 16 Kbytes. Since the data entity corresponds to an application, the classification effectively represents the classification of an application 112 that generated the read request 224. The classification table 242 used by the data entity classifier 240 can be generated similarly to the classification table 132 used by the application classifier 130 as described above, except that the values in the application column of the table 132 can be replaced with the data entity identifier of the data entity associated with the application. This replacement process can be performed at container deployment time, for example. As an alternative to using the classification table 242, the data entity classifier 240 can use a machine learning model trained on historical access pattern data for particular applications, as described above with reference to the classification table 132 of FIG. 1.

Upon generating the cache classification, the server-side cache manager 230 can identify a cache type associated with the cache classification (operation 236). If the cache classification is a classification value (e.g., "compressed" or "non-compressed"), the server-side cache manager 230 can use the classification value as the cache type. If the cache classification is a classification rule, the server-side cache manager 230 can evaluate the rule. The server-side cache manager 230 can evaluate the classification rule using information available at the time the read request 224 is received, such as the address and size of the requested data. For example, the rule can specify that the classification value is "compressed" if an address specified in the read request 224 is less than a threshold distance (e.g., in bytes) from a previous address specified in a previous read request. As another example, the rule can specify that the classification value is "compressed" if an average size of past read requests received by the server computing device 140 is greater than a threshold size.

The server-side cache manager 230 can determine whether the identified cache type is "compressed" (operation 244). If so, the server-side cache manager 230 can read data from compressed cache memory 150 (operation 248). Otherwise, if the identified cache type is "not compressed", the server-side cache manager 230 can read data from non-compressed cache memory 152 (operation 246). If the requested data is not present in the cache memory that corresponds to the identified cache type, then the server-side cache manager 230 can read the requested data from the persistent storage 154. The server-side cache manager 230 can then send the data to the application 112 on the client computing device 102 as data 160 (operation 148). The application 112 can receive the data 160 (operation 116) and perform other operations using the data 160.

In other embodiments, the server-side cache manager 230 can read data from the identified cache type and, if the data is not present in the identified cache type, read data from the other cache type(s). The server-side cache manager 230 can read data from the other cache type(s) if, for example, the application has multiple threads, each having a different access pattern. Depending on which thread reads a particular block of data, the data can be in either the compressed cache or the non-compressed cache. Thus, the server-side cache manager 230 can determine whether the identified cache type is "compressed" (operation 244). If the cache type identified at operation 244 is compressed, the server-side cache manager 230 can attempt to read data from compressed cache memory 150 (operation 248). If the requested data is not present in the compressed cache memory 150, then the server-side cache manager 230 can attempt to read data from the non-compressed cache memory 152 (operation 246). The server-side cache manager 230 can then send the data read from the compressed or non-compressed cache memory to the application 112 on the client computing device 102 as data 160 (operation 148).

Otherwise, if the cache type identified at operation 244 is not "compressed", the server-side cache manager 230 can attempt to read data from non-compressed cache memory 152 (operation 246). If the requested data is not present in the non-compressed cache memory 152, then the server-side cache manager 230 can attempt to read data from the compressed cache memory 150 (operation 248). The server-side cache manager 230 can then send the data read from the compressed or non-compressed cache memory to the application 112 on the client computing device 102 as data 160 (operation 148).

If the requested data is not present in any of the cache memories, then the server-side cache manager 230 can read the requested data from the persistent storage 154. The server-side cache manager 230 can then send the data read from the compressed or non-compressed cache memory to the application 112 on the client computing device 102 as data 160 (operation 148). The application 112 can receive the data 160 (operation 116) and perform other operations using the data 160.

Figure 3:
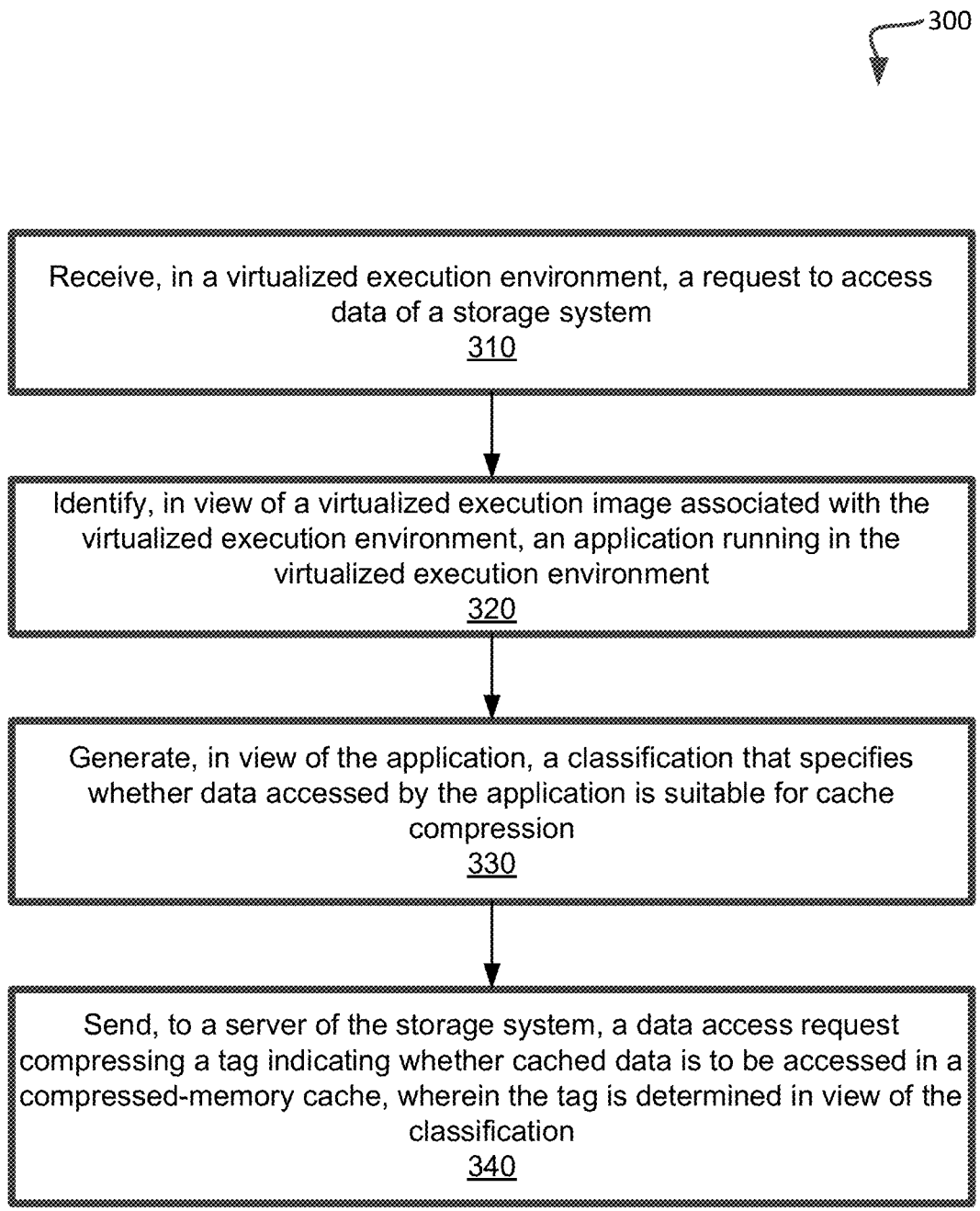
FIG. 3 depicts a flow diagram of an example method for generating a request to access data in a compressed cache or a non-compressed cache in accordance with a cache classification of a requesting application, in accordance with one or more aspects of the present disclosure.

FIG. 3 depicts a flow diagram of an example method 300 for generating a request to access data in a compressed cache or a non-compressed cache in accordance with a cache classification of a requesting application, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a client computing device 102 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 310. At block 310, a computing device may receive, in a container environment, a request to access data in a storage system. The request can be a read request (to retrieve data from the storage system), for example. At block 320, the computing device may identify, in accordance with a virtualized execution image, such as a virtual machine image, or in accordance with the container execution environment, a container image. For example, the container image can be identified by image information, e.g., metadata, associated with the image. In another example, the container image can be identifiable from its image signature in the container image registry. The application can be identified in view of metadata included in the container image, for example. In one example, the metadata can include one or more of an application name or an application version, either or both of which can be used to identify the application. At block 330, the computing device may generate, in accordance with the application, a classification that specifies whether data accessed by the application is suitable for cache compression. The cache classification can be generated by identifying, in a data structure (e.g., a classification mapping table) comprising one or more records, a cache classification record that specifies a stored identifier of the application, wherein the record further specifies a stored cache classification.

The computing device may generate a classification table comprising one or more records, where each record comprises a particular application identifier and a particular cache classification. The computing device may generate the classification table by determining whether a past data access pattern of a previous execution of a particular application satisfies one or more threshold access pattern criteria. Responsive to determining that the past data access pattern of a previous execution of the particular application satisfies one or more threshold access pattern criteria, the computing device may generate a cache classification record that comprises a particular application identifier identifying the particular application and a particular cache classification specifying that data accessed by the particular application is suitable for cache compression.

Further, responsive to determining that the past data access pattern of a previous execution of the particular application does not satisfy one or more threshold access pattern criteria, the computing device may generate a cache classification record that comprises a particular application identifier identifying the particular application and a particular cache classification specifying that data accessed by the particular application is not suitable for cache compression. The computing device may include the generated cache classification record(s) in the classification table.

The past data access pattern can include a number N of previous data access operations, e.g., 100 or other suitable number. The previous data access operations can be, for example, read operations. The previous data access operations and can be, but are not necessarily, consecutive data access operations. The threshold access pattern criteria can include, for example, a threshold storage region size that specifies a size of a storage region in a logical device, in which case the past data access pattern satisfies the threshold access pattern criteria if at least a threshold number T of the data accesses in the past data access pattern reference a respective storage location in a storage region of the specified size. For example, suppose the threshold storage region size is 64 Kbytes, the past data access pattern includes N=100 previous data access operations, and the threshold number T is 80 data accesses. If there is a subset of operations of the past data access pattern such that the subset has at least T=80 data access operations and each of the data access operations in the subset reads data from a respective address that is less than 64 Kbytes distant from each of the addresses read by the other data access operations in the subset, then the past data access pattern satisfies the threshold access pattern criteria, and the past access pattern can be considered a local access pattern in a 64 Kbyte region. As another example, a past access pattern can be considered a local access pattern in a 64 Kbyte region if there is a subset of data access operations in the past access pattern such that each data access operation in the subset accesses data in a 64 Kbyte region. Such a local access pattern can be suitable for cache compression. If the past data access pattern satisfies the threshold access pattern criteria (accesses are within a 64 Kbyte region), the generated record's cache classification can be "compression" (specifying that data accessed by the application is suitable for cache compression), for example.

The classification can be further generated from one or more attributes of the application. The attributes can include an access pattern, which can be, for example, a random access pattern or a sequential access pattern, and/or a type of the application, where the type can be one of streaming or transactional. The attributes of the application can be derived from configuration parameters, for example. For example, if streaming applications are known to be suitable for cache compression, and an attribute of the application indicates that the application is of a streaming type, then the generated record can specify that the record's cache classification is be "compression". Although the access patterns are described as being random access or sequential in the examples herein, other access patterns are possible and can be specified by attributes and used to determine cache classification. For example, an access pattern can be semi-sequential, semi-random, or other hybrid access pattern. Further, although application types are described as being streaming or transactional, other application types are possible and can be used to determine the record's cache classification. Other possible application types are machine learning, user interface, compute intensive, data processing, and so on. Machine learning applications can be mapped to non-compression, for example, if machine learning applications are known to have access patterns suitable for non-compressed caches. User interface and data processing applications can also be mapped to non-compression if such applications are known to have access patterns suitable for non-compressed caches. Compute intensive applications can be mapped to cache compression if compute intensive applications are known to have access patterns suitable for compressed caches.

At block 340, the computing device may send, to a server of the storage system, a data access request that includes a tag indicating whether cached data is to be access in a compressed-memory cache, where the tag is determined in view of the classification. If the data access request is a read request, the computing device can subsequently receive a response containing the requested data from the server of the storage system. In some embodiments, if the computing device is unable to determine a classification, but it can set the tag to a predetermined classification (e.g., compressed or non-compressed) to provide a hint of which cache to store the data in if the data was not cached prior to sending the request. Thus, the tag can indicate whether cached data is to be stored in the compressed-memory cache or the non-compressed cache. Responsive to completing the operations described herein above with reference to operation 340, the method may terminate.

Figure 4:
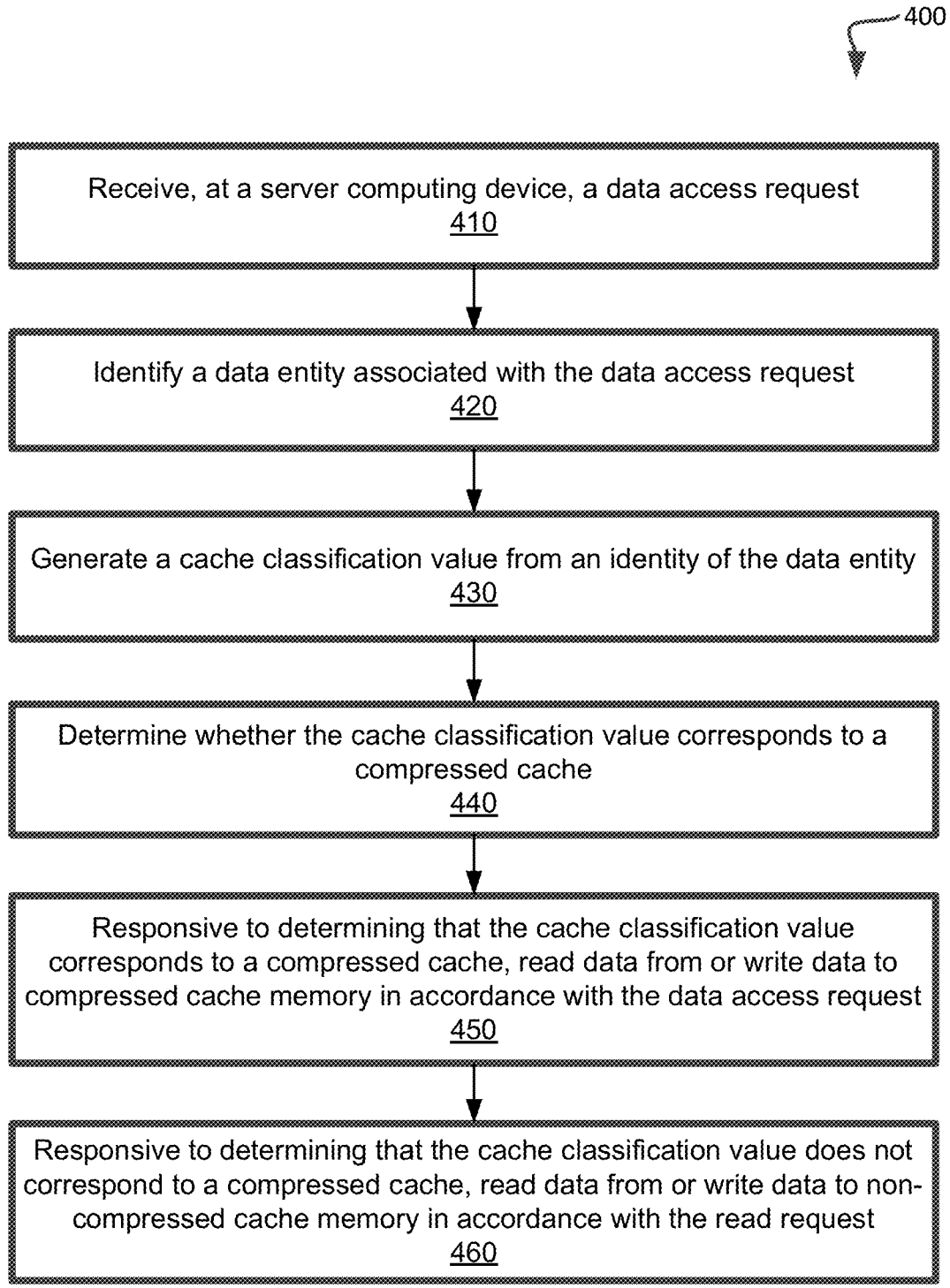
FIG. 4 depicts a flow diagram of an example method for accessing data in a compressed cache or a non-compressed cache at a server computer system in response to a data access request that does not specify a cache classification, in accordance with one or more aspects of the present disclosure.

FIG. 4 depicts a flow diagram of an example method 400 for accessing data in a compressed cache or a non-compressed cache at a server computer system in response to a data access request that does not specify a cache classification, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a server computing device 140 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a computing device may receive, at a server computing device, a data access request. The data access request can be, e.g., a data read request or a data write request. If the data access request is a write request, the data access request can include or specify data to be written. At block 420, the computing device may identify a data entity associated with the data access request. At block 430, the computing device may generate a cache classification value from an identity of the data entity. At block 440, the computing device may determine whether the cache classification value corresponds to a compressed cache. At block 450, the computing device may, responsive to determining that the cache classification value corresponds to a compressed cache, read data from compressed cache memory in accordance with the data access request if the data access request is a read request (or write data to the compressed cache memory in accordance with the data access request if the data access request is a write request). At block 460, the computing device may, responsive to determining that the cache classification value does not correspond to a compressed cache, read data from non-compressed cache memory in accordance with the data access request if the data access request is a read request (or write data to the compressed cache memory in accordance with the data access request if the data access request is a write request). Responsive to completing the operations described herein above with reference to operation 460, the method may, if the data access request is a read request, send the data read from the compressed or non-compressed cache memory to a client computer system as a response to the data access request, and subsequently terminate.

Figure 5:
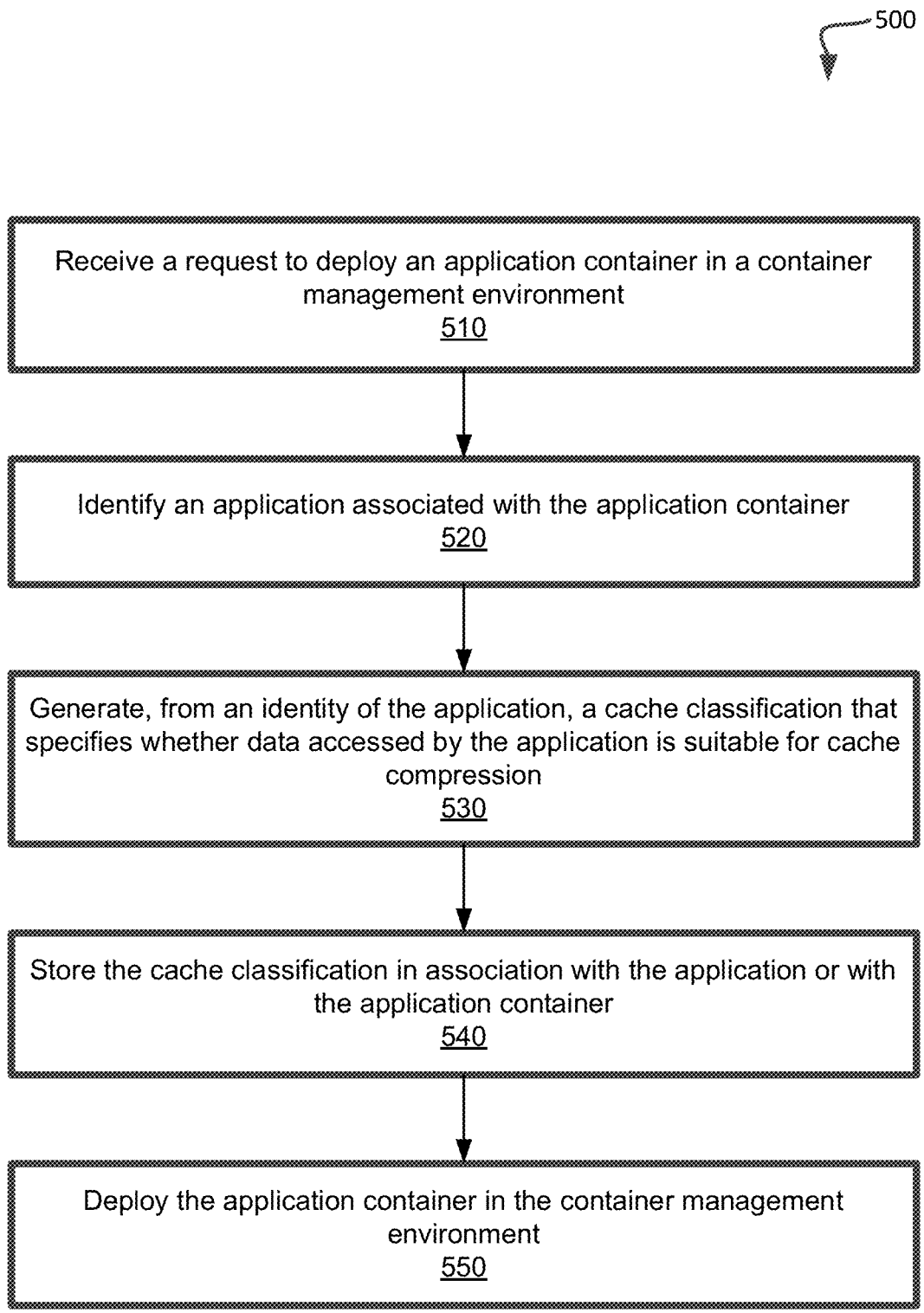
FIG. 5 depicts a flow diagram of an example method for deploying an application container and generating cache compression classifications at deployment time, in accordance with one or more aspects of the present disclosure.

FIG. 5 depicts a flow diagram of an example method for deploying an application container and generating cache compression classifications at deployment time, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a client computing device 102 as shown in FIG. 1, by a server computing device 140 as shown in FIG. 2, or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at block 510. At block 510, a computing device may receive a request to deploy an application container in a container management environment. At block 520, the computing device may identify an application associated with the application container. At block 530, the computing device may generate, from an identity of the application, a cache classification that specifies whether data accessed by the application is suitable for cache compression.

At block 540, the computing device may store the cache classification in association with the application or with the application container. Once the application container 110 is deployed for execution (e.g., subsequent to the completion of method 500), the client-side cache manager 120 can use the stored cache classification to tag and send each read request (operation 126), and need not generate the cache classification for each read request. Alternatively or additionally, at block 540, the computing device may store the cache classification in association with another entity, such as a data entity, and a system component can use the stored cache classification to determine whether to use a compressed or non-compressed cache, For example, a cache manager in an operating system or hypervisor, or in local storage drivers, can use the stored cache classification to determine whether to use a compressed or non-compressed cache. If the stored cache classification is a classification value, e.g., "compressed" or "non-compressed", then the corresponding tag can correspond to the classification value. Alternatively, if the cache classification is a classification rule, then the client-side cache manager 120 can evaluate the classification rule in accordance with data values referenced by the rule's criteria, such as a size or address of the requested data. At block 550, the computing device may deploy the application container in the container management environment. Responsive to completing the operations described herein above with reference to block 550, the method may terminate.

Figure 6:
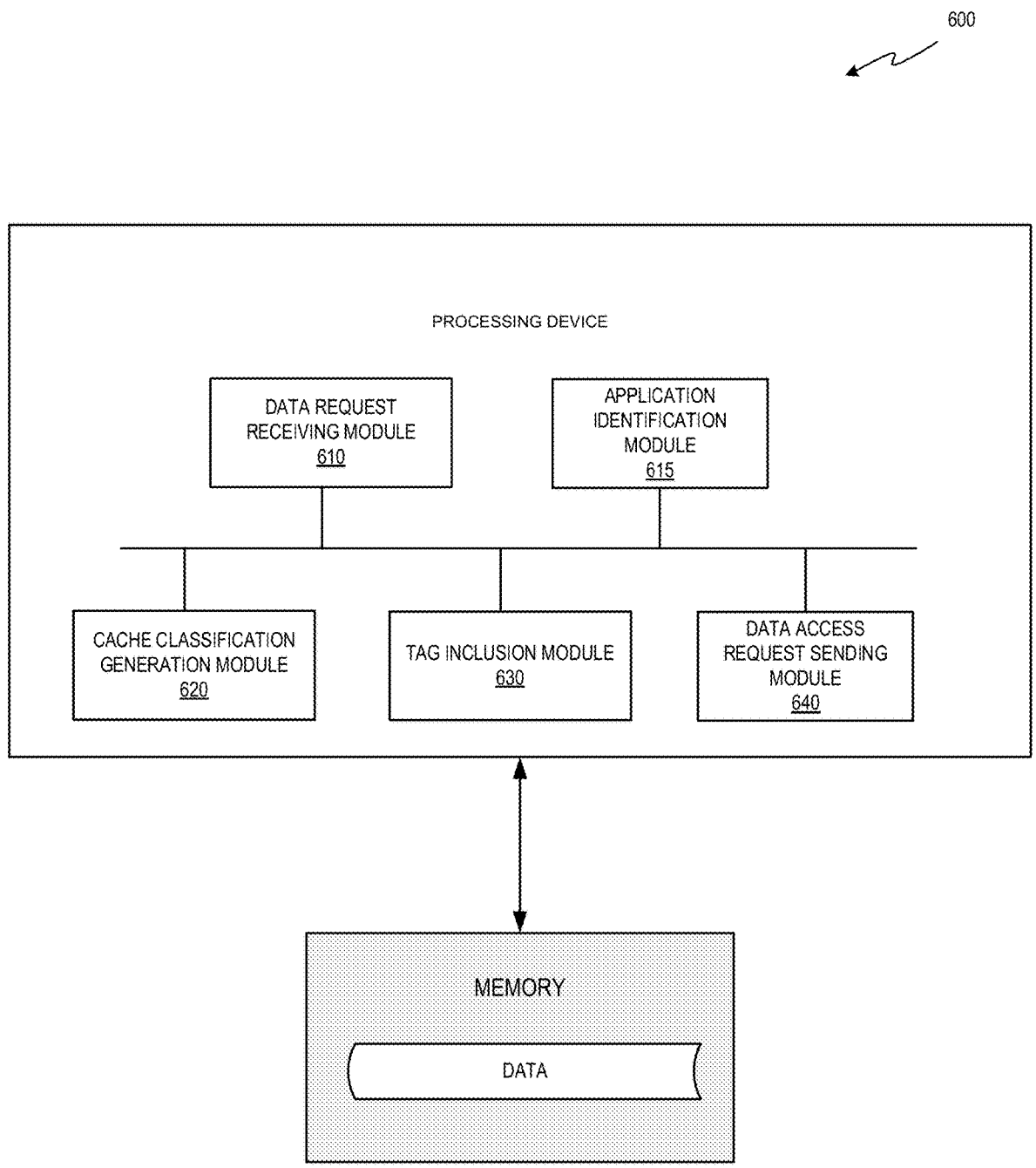
FIG. 6 depicts a block diagram of an example computer system in accordance with one or more aspects of the present disclosure.

FIG. 6 depicts a block diagram of a computer system 600 operating in accordance with one or more aspects of the present disclosure. Computer system 600 may be the same or similar to client computing device 102 of FIG. 1 or server computing device 140 of FIG. 2, and may include one or more processors and one or more memory devices. In the example shown, computer system 600 may include a data request receiving module 610, an application identification module 615, a cache classification generation module 620, a tag inclusion module 630, and a data access request sending module 640.

Data request receiving module 610 may enable a processor to receive, in a container environment, a request to access data stored in a storage system. Application identification module 615 may enable the processor to identify, in view of a container image associated with the request, an application running in the container environment. The application may be identified in view of metadata included in the container image, where the metadata comprises one or more of an application name or an application version. Cache classification generation module 620 may enable the processor to generate, in view of the application, a cache classification that specifies whether data accessed by the application is suitable for cache compression. To generate the cache classification, cache classification generation module 620 may enable the processor to identify, in a classification table that includes one or more records, a cache classification record that specifies a stored identifier of the application, wherein the record further specifies a stored cache classification.

Tag inclusion module 630 may enable the processor to include, in the data access request, a tag indicating whether cached data is to be access in a compressed-memory cache, wherein the tag is determined in view of the cache classification. Data access request sending module 640 may enable the processor to send, to a server of the storage system, the data access request.

Figure 7:
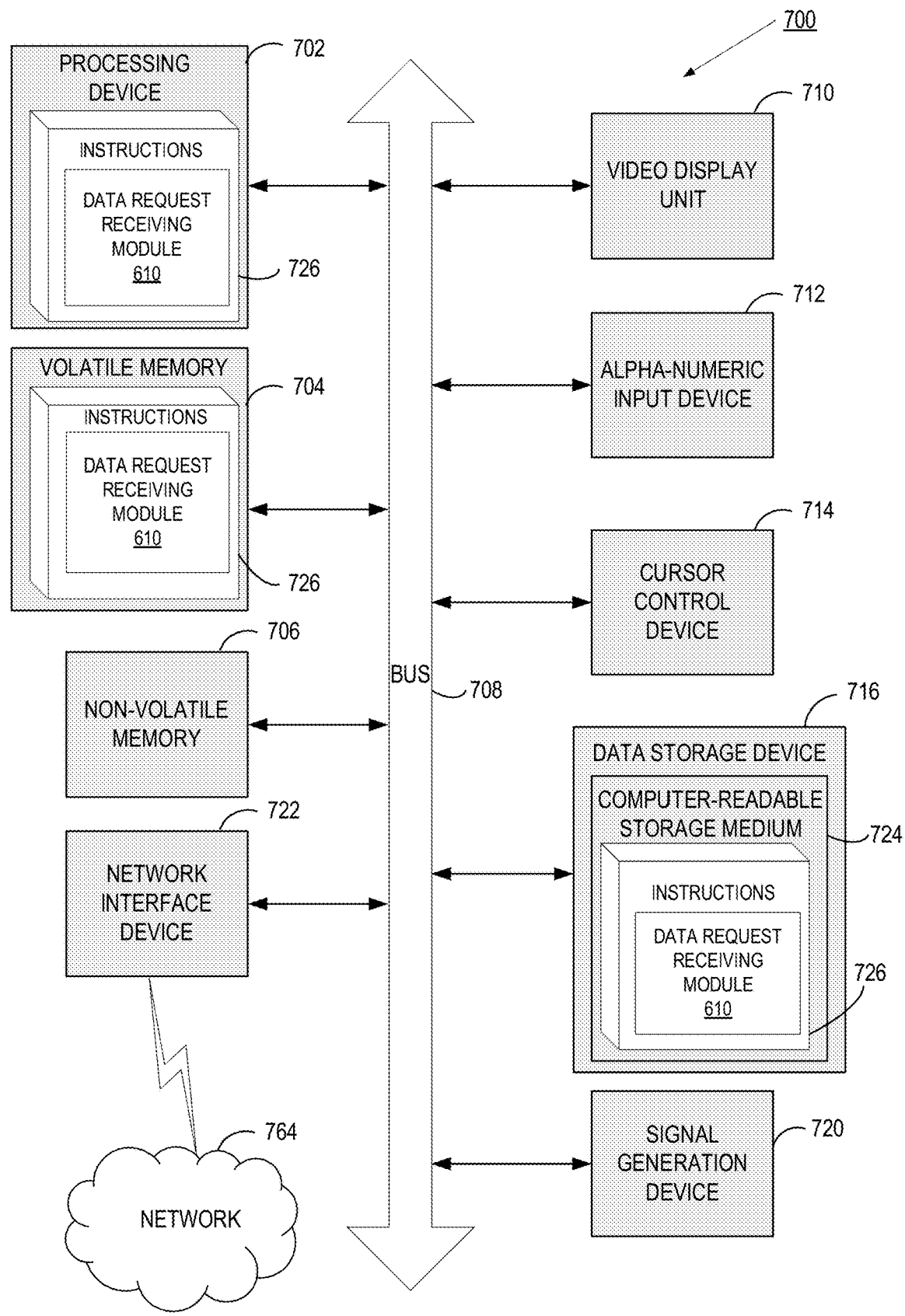
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to client computing device 102 of FIG. 1 or server computing device 140 of FIG. 2. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing method 400 or 500.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
receiving, by a cache manager of a storage system executing on a computing system comprising one or more computing devices, a first data read request originating from a first application;
generating, by the cache manager, a first cache classification indicating the first application is suitable to receive compressed data, the first cache classification based on past data accessed by the first application;
determining, by the cache manager based on the first cache classification associated with the first application, that a compressed cache memory maintained by the storage system is to be selected to satisfy the first data read request, wherein the storage system maintains a non-compressed cache memory and the compressed cache memory; and
in response to determining that the compressed cache memory is to be selected, accessing, by the storage system, the compressed cache memory to satisfy the first data read request.

2. The method of claim 1, further comprising:
determining, by the cache manager, an identity of the first application; and
based on the identity of the first application, determining the first cache classification associated with the first application.

3. The method of claim 2, wherein determining, by the cache manager, the identity of the first application comprises determining, by the cache manager, the identity of the first application based on a container image from which the first application was executed.

4. The method of claim 1, further comprising:
generating, by the cache manager, a tag that indicates the compressed cache memory is to be selected; and
sending, by the cache manager to a server computing device of the one or more computing devices, the first data read request and the tag.

5. The method of claim 1, further comprising:
accessing, by the cache manager, a first record of a mapping data structure that corresponds to the first application, where the mapping data structure comprises a plurality of records including the first record, each record of the plurality of records comprising an identifier of an application of a plurality of applications and a cache classification associated with the respective application; and determining, by the cache manager based on the first record, the first cache classification associated with the first application.

6. The method of claim 1, further comprising:
receiving, by the cache manager, a second data read request originating from a second application;
determining, by the cache manager based on a second cache classification associated with the second application, that the non-compressed cache memory maintained by the storage system is to be selected to satisfy the second data read request; and
in response to determining that the non-compressed cache memory is to be selected, accessing, by the storage system, the non-compressed cache memory to satisfy the second data read request.

7. The method of claim 1, further comprising determining, by the cache manager, the first cache classification based on a previous data access pattern of the first application.

8. The method of claim 1, further comprising determining, by the cache manager, the first cache classification based on an application type of the first application selected from a group of a streaming application type and a transactional application type.

9. A computing system, comprising:
one or more computing devices to:
receive, by a cache manager of a storage system executing on the computing system, a first data read request originating from a first application;
generate, by the cache manager, a first cache classification indicating the first application is suitable to receive compressed data, the first cache classification based on past data accessed by the first application;
determine, by the cache manager based on the first cache classification associated with the first application, that a compressed cache memory maintained by the storage system is to be selected to satisfy the first data read request, wherein the storage system maintains a non-compressed cache memory and the compressed cache memory; and
in response to determining that the compressed cache memory is to be selected, access, by the storage system, the compressed cache memory to satisfy the first data read request.

10. The computing system of claim 9, wherein the one or more computing devices are further to:
determine, by the cache manager, an identity of the first application; and
based on the identity of the first application, determine the first cache classification associated with the first application.

11. The computing system of claim 9, wherein the one or more computing devices are further to:
generate, by the cache manager, a tag that indicates the compressed cache memory is to be selected; and
send, by the cache manager to a server computing device of the one or more computing devices, the first data read request and the tag.

12. The computing system of claim 9, wherein the one or more computing devices are further to:
access, by the cache manager, a first record of a mapping data structure that corresponds to the first application, where the mapping data structure comprises a plurality of records including the first record, each record of the plurality of records comprising an identifier of an application of a plurality of applications and a cache classification associated with the respective application; and determine, by the cache manager based on the first record, the first cache classification associated with the first application.

13. The computing system of claim 9, wherein the one or more computing devices are further to:
receive, by the cache manager, a second data read request originating from a second application;
determine, by the cache manager based on a second cache classification associated with the second application, that the non-compressed cache memory maintained by the storage system is to be selected to satisfy the second data read request; and
in response to determining that the non-compressed cache memory is to be selected, access, by the storage system, the non-compressed cache memory to satisfy the second data read request.

14. The computing system of claim 9, wherein the one or more computing devices are further to determine, by the cache manager, the first cache classification based on a previous data access pattern of the first application.

15. The computing system of claim 9, wherein the one or more computing devices are further to determine, by the cache manager, the first cache classification based on an application type of the first application selected from a group of a streaming application type and a transactional application type.

16. A non-transitory computer-readable storage medium that includes executable instructions to cause one or more computing devices to:
receive, by a cache manager of a storage system executing on the computing system, a first data read request originating from a first application;
generate, by the cache manager, a first cache classification indicating the first application is suitable to receive compressed data, the first cache classification based on past data accessed by the first application;
determine, by the cache manager based on the first cache classification associated with the first application, that a compressed cache memory maintained by the storage system is to be selected to satisfy the first data read request, wherein the storage system maintains a non-compressed cache memory and the compressed cache memory; and
in response to determining that the compressed cache memory is to be selected, access, by the storage system, the compressed cache memory to satisfy the first data read request.

17. The non-transitory computer-readable storage medium of claim 16, wherein the instructions further cause the one or more computing devices to:
determine, by the cache manager, an identity of the first application; and
based on the identity of the first application, determine the first cache classification associated with the first application.

18. The non-transitory computer-readable storage medium of claim 16, wherein the instructions further cause the one or more computing devices to:
generate, by the cache manager, a tag that indicates the compressed cache memory is to be selected; and
send, by the cache manager to a server computing device of the one or more computing devices, the first data read request and the tag.

19. The non-transitory computer-readable storage medium of claim 16, wherein the instructions further cause the one or more computing devices to:
access, by the cache manager, a first record of a mapping data structure that corresponds to the first application, where the mapping data structure comprises a plurality of records including the first record, each record of the plurality of records comprising an identifier of an application of a plurality of applications and a cache classification associated with the respective application; and
determine, by the cache manager based on the first record, the first cache classification associated with the first application.

20. The non-transitory computer-readable storage medium of claim 16, wherein the instructions further cause the one or more computing devices to:
receive, by the cache manager, a second data read request originating from a second application;
determine, by the cache manager based on a second cache classification associated with the second application, that the non-compressed cache memory maintained by the storage system is to be selected to satisfy the second data read request; and
in response to determining that the non-compressed cache memory is to be selected, access, by the storage system, the non-compressed cache memory to satisfy the second data read request.

* * * * *